United States Patent [19]

Stearns

[11] 4,083,378
[45] Apr. 11, 1978

[54] WATER DRIVE SYSTEM FOR A MOBILE AGRICULTURAL IRRIGATION UNIT

[75] Inventor: Richard H. Stearns, Amarillo, Tex.

[73] Assignee: Lindsay Manufacturing Company, Lindsay, Nebr.

[21] Appl. No.: 678,189

[22] Filed: Apr. 19, 1976

[51] Int. Cl.² .............................................. B05B 3/00
[52] U.S. Cl. ..................................... 137/344; 239/177
[58] Field of Search ............... 239/177; 137/344, 546; 239/212

[56] References Cited

U.S. PATENT DOCUMENTS

| | | | |
|---|---|---|---|
| 2,726,895 | 12/1955 | Behlen | 239/212 X |
| 2,893,643 | 7/1959 | Gordon | 239/177 X |
| 2,941,727 | 6/1960 | Zybach | 239/177 |
| 3,766,937 | 10/1973 | Lundvall et al. | 137/344 |
| 3,785,400 | 1/1974 | Zimmerer et al. | 137/344 |
| 3,916,942 | 11/1975 | Townsend | 137/344 |

*Primary Examiner*—Alan Cohan
*Assistant Examiner*—Gerald A. Michalsky
*Attorney, Agent, or Firm*—Kinzer, Plyer, Dorn & McEachran

[57] ABSTRACT

This is concerned with a water-driven unit for a center pivot irrigation system in which the pressure of the water in the pipe extending out from the center pivot is used as the motive force for moving the towers about the center pivot.

12 Claims, 2 Drawing Figures

WATER DRIVE SYSTEM FOR A MOBILE AGRICULTURAL IRRIGATION UNIT

SUMMARY OF THE INVENTION

This invention is concerned with a center pivot irrigation system and is more specifically concerned with a so-called water drive for such a system.

A primary object of the invention is a water drive for a center pivot irrigation system which eliminates the very high wear present in prior water drive systems.

Another object is a water drive system of the above type which eliminates high impact points and minimizes adjustment requirements.

Another object is a water drive system that uses a pilot-operated cycling valve.

Another object is an alignment system for a center pivot water drive unit which has a minimum amount of water controlled by the alignment mechanism.

Another object is a water drive system for a center pivot irrigation unit which uses standard off-the-shelf parts and requires a minimum, if any, specials.

Another object is a water drive for a center pivot irrigation system which is compatible with and requires a minimum amount of alteration in known electric drive units.

Another object is a water drive system of the above type which is compatible with known electric drive systems.

Another object is a water drive unit of the above type which prevents or avoids the problem of the alignment valve sticking or clogging.

Another object is a water drive system of the above type which uses a settling tank so that foreign matter in the water, such as dirt and sand, may settle out.

Another object is a water drive system of the above type which will require a minimum of maintenance.

Other objects will appears from time to time in the ensuing specification and drawings.

DESCRIPTION OF THE PREFERRED EMBODIMENTS

Figure 1:
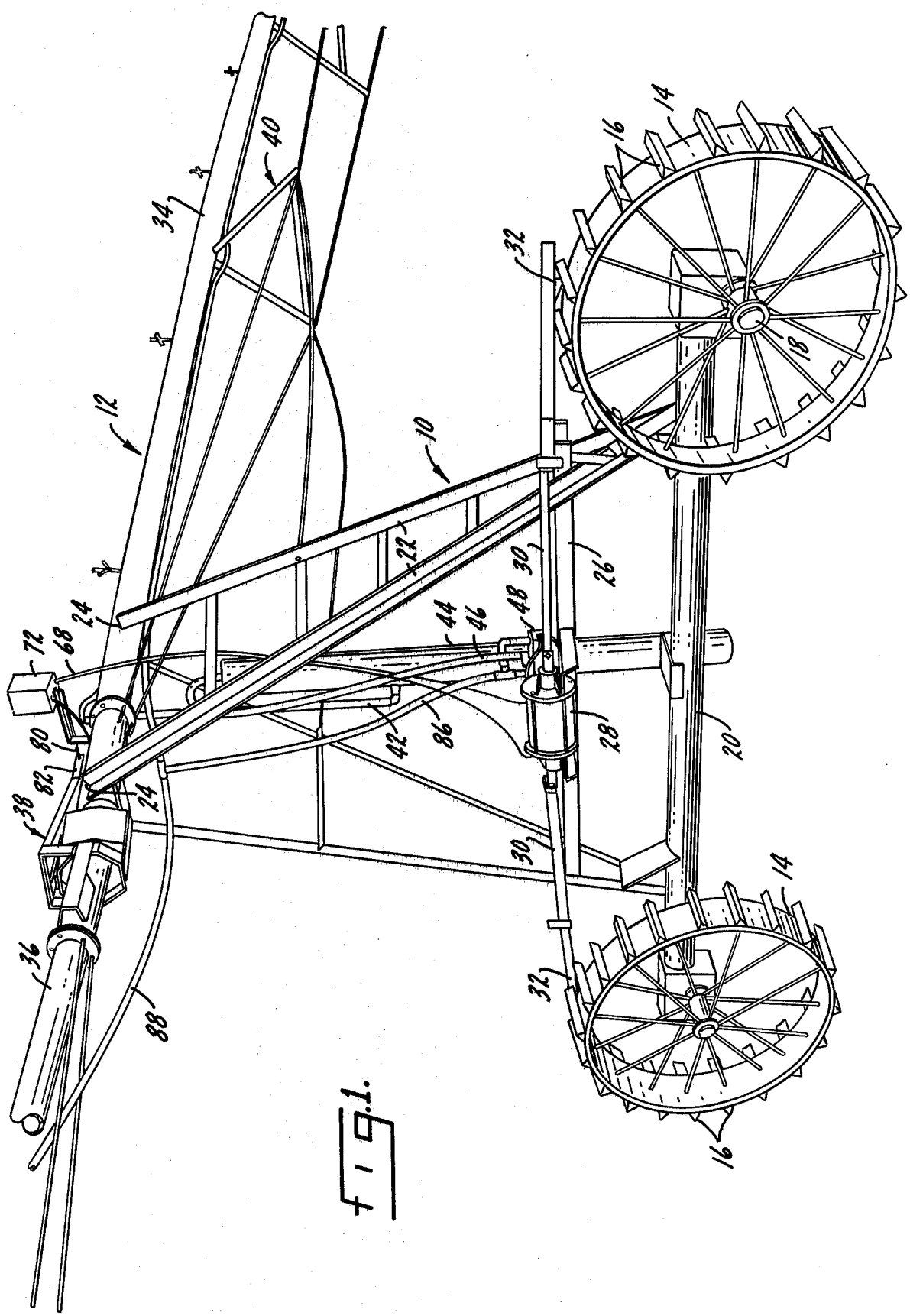
FIG. 1 is a perspective of one of the towers in a water-driven center pivot irrigation system.

In FIG. 1 a tower 10 is shown supporting a pipeline structure 12 and it may be assumed that a plurality of such towers at spaced intervals support a pipeline extending outwardly from a center pivot.

In detail, the tower 10 may include wheels 14 with lugs 16 thereon that overlap one edge so as to operate a ratchet with a water drive mechanism explained hereinafter. The wheels are on suitable pivots 18 on the ends of a main structure member 20 from which pairs of angle irons 22 extend upwardly on each side and they diverge somewhat to their upper end 24 where they are welded or otherwise suitably connected to the pipeline. The makeup of the frame of the tower has only been referred to generally and is not considered important in detail.

An intermediate support 26 in the tower supports a main power cylinder 28 in any suitable manner, which has piston rods 30 extending out each end thereof with a ratchet or hook 32 on each end, not shown in detail, to engage the lug extensions on the wheels to rotate them in increments or steps, in a conventional manner. In the arrangement shown in FIG. 1, it may be assumed that the power stroke of cylinder 28 is from right to left causing the wheels to rotate counterclockwise, with the return stroke, from left to right, being being an idling stroke, but it may be otherwise. The main pipe 34 may be made up in sections or lengths, each of which has a tower connected adjacent one end, as at 24 in FIG. 1, with the free or opposite end, indicated generally at 36 in FIG. 1 of the next adjacent tower, being connected thereto through an articulated joint, indicated generally at 38, which may be of the type shown generally in U.S. Pat. No. 3,738,687, issued June 12, 1973, and presently available from Lindsay Manufacturing Co., Lindsay, Nebr., under the trademark "UNIKNUCKLE". Each of the pipe lengths or sections 34 may be provided with a suitable bracing or truss structure, indicated generally at 40.

Figure 2:
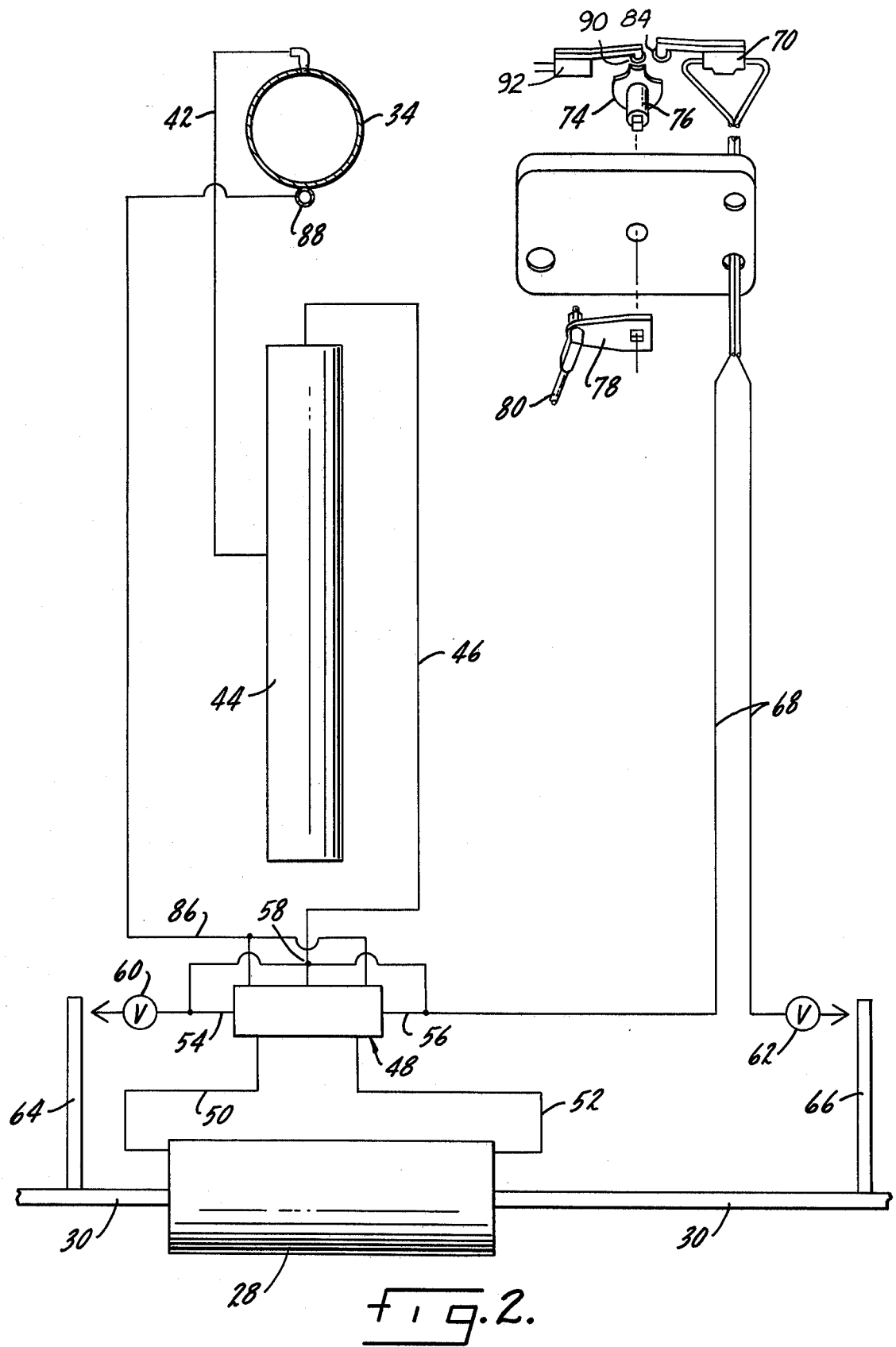
FIG. 2 is a schematic of the water drive.

A water supply line 42, in FIG. 2, connects into the main pipe 34, preferably in the top thereof so that a minimum of sediment and sand will be carried over. Supply line 42 leads down to a settling tank 44 which is mounted on the tower frame in any suitable manner with the supply line being connected at some intermediate point. The water in the settling tank may be relatively quiescent so that any dirt, sand and foreign matter carried in it will settle to the bottom and may be periodically discharged by any suitable vent or drain cock, not shown. Water may then be taken out of the top of the settling tank, or at a point adjacent the top, through a supply line 46 and brought down to cycling valve 48 which may be a conventional pilot-operated water cycling valve which supplies the pressure water from inlet line 46 to either one end or the other of the main power cylinder 28 through connecting lines 50 and 52, depending upon the position of the spool in the cycling valve. Pilot lines 54 and 56 are connected on each end of the cycling valve and are in turn connected back to the inlet line 46, as at 58. While the inlet line 46 and connecting lines 50 and 52 to the power cylinder will be relatively large since they must carry a sufficient volume of water to operate the power cylinder 28, the pilot lines 54 and 56, and those pilot lines referred to hereinafter, may be relatively small since they only carry a very small or pilot amount of water and full flow is not necessary or desirable.

The pilot lines 54 and 56 on each end of the cycling valve have bleed or dump valves 60 and 62 which are operated, as schematically shown in FIG. 2, by extensions or brackets 64 and 66 mounted on the piston rod 30 of a main power cylinder. When the piston rod 30 of the main power cylinder is in its extreme right position, in FIG. 2, bracket 64 will contact and open bleed valve 60, thereby relieving the pressure, through line 54, on the left end of the cycling valve, which will cause it to shift, from right to left. At the other extreme of movement, when the piston rod 30 is in its full left positon, bracket 66 will contact and open bleed valve 62 which will relieve the pressure through line 56 on the right end of the cycling valve causing the spool therein to shift, from left to right.

It will be noted in FIG. 2 that the pilot or bleed line running to bleed valve 62 has been branched up, as at 68, through a pilot or minivalve 70 which may be contained in a control box 72, shown on top of the tower in FIG. 1. The control box 72 is mounted on a suitable bracket or the like and a cam 74 is positioned in the control box on a suitable pivot 76 which extends through the bottom of the box and is connected to an arm 78 which is rotated by a link 80 which, as shown in FIG. 1, extends over and is connected to an arm 82 which is a part of the articulated joint 38 between adjacent pipe sections. In the arrangement shown it may be assumed that the arm 82 is more or less rigidly joined to the free end 36 of the next pipe section, to the left in FIG. 1, so that horizontal angulation between the adjacent pipe sections 34 and 36 will be reflected in or cause movement of arm 82 which in turn, through link 80 and lever arm 78, will rotate cam 74 in one direction or the other. The cam lobe operates against a follower 84 in FIG. 2 which opens or closes the minivalve 70 in pilot line extension 68.

When one side of the power cylinder 28 is operating on a power stroke, the other side will be exhausted and the exhaust water goes through a discharge line 86 which may be connected to a porous tube or hose 88 held onto the pipe section so that the discharge water will leak out through pores or openings in hose 88 at various points along the length of the main pipe, rather than being discharged directly under the tower which will create a muddy condition and deep ruts around the wheels.

The use, operation and function of the invention are as follows:

The water drive system shown and described has the advantage that all of the parts are standard or conventional. The power cylinder that rotates the wheels in a step-by-step or ratcheting action is old and well known. The cycling valve that controls it is a standard off-the-shelf item. The bleed valves are known, as is the minivalve in the control box. The control box itself, as well as its operating parts, i.e. the control cam and the linkage mechanism to the articulated joint 38 between the pipe sections are all old and well known, for example see U.S. Pat. Nos. 3,785,400, issued Jan. 15, 1974, and 3,738,678, issued June 12, 1973.

In prior water drive systems all of the water going to the main power cylinder has gone through an alignment valve which responds to the alignment between adjacent pipe sections. This has created problems since this alignment valve must handle a substantial gallonage of water which has dirt and sand in it. This has resulted in the alignment valve itself sticking or clogging due to the grit and sand that accumulates which, in due time, will cause the valve not to respond to alignment.

The present arrangement has the advantage that the water that is controlled by the alignment mechanism in the control box is a minivalve that handles a small fractional part of the total water involved and is really a pressure indicator or transmitter running to and controlling the cycling valve. Since the cycling valve will react to the unbalance of pressures between its ends, the bleed valve on each end will cause it to reverse automatically which in turn will reverse the operation of the power cylinder. There will be no high impact points and heavy wear that goes therewith. Nor will there be excessive wear and adjustment problems.

In addition, the minivalve in the control box can use the existing parts from a present electric drive system, of the type in U.S. Pat. No. 3,785,400, dated Jan. 15, 1974. And, in fact, the water minivalve which controls alignment will take the place of the electric microswitch without any other changes. And the arrangement may include the electrical safety shutdown unit, such as in the above referred to patent. The safety shutdown unit utilizes the cam 74 and follower 90 to actuate an electric switch 92 which de-energizes the system in the event of a substantial misalignment.

In the arrangement shown, as long as the alignment minivalve 70 in the control is open, the power cylinder will reciprocate which will move the tower. But when the alignment mechanism of the articulated joint 38 moves the cam, or whatever control is used, to close the alignment valve 70, the bleed valve 62 on that side then becomes ineffective and the right side of the cycling valve 48 will stay pressurized. This means that when the power cylinder moves to its full left position and opens bleed valve 62, it will stop and the unit will not reverse. The tower will stay in this position until the next adjacent pipe section, as at 36 in FIG. 1, gets ahead to a degree such that the alignment mechanism in the articulated joint 38 moves the cam to open the alignment valve 70. Bleed valve 62 will still be open and this will drain the bleed on the right side of the cycling valve causing it to shift from left to right which will start the water drive again for this tower. Hereinafter the tower moves a certain amount, the alignement valve 70 in the control box will close again which will stop the unit at the completion of the next cycle. And it should be understood that the power cylinder may be stopped either at the end of a power stroke or a return stroke. It should also be understood that the power cylinder may be single-acting with a spring return. This set-up would involve eliminating connecting line 52 and a left piston rod 30. Bleed valve 60 and bracket 64 would be relocated to sense the completion of a power stroke.

The use of a large settling or surge tank, as indicated at 44, has the advantage that any grit and sand in the water will settle out and may be vented or bled out the bottom of the tank from time to time, either automatically or by hand. This will protect the cycling valve, as well as the main power cylinder, the bleed valves, the alignment valve, etc.

While a preferred form and several variations have been shown and suggested, it should be understood that suitable additional modifications, changes, substitutions and alterations may be made without departing from the invention's fundamental theme.

The embodiments of the invention in which an exclusive property or privilege is claimed are defined as follows:

1. In a water drive for an irrigation system, an elongated main water pipe supported at intervals on self-propelled wheeled towers and extending outwardly from a center pivot, a power cylinder on each tower adapted to reciprocate and constructed to rotate the wheels, a supply line connected between the main water pipe and the power cylinder so that the pressure of the water in the main pipe will operate the cylinder, a pilot-operated cycling valve in the supply line to alternately supply water to at least one end of the power cylinder, pilot lines connected to each end of the cycling valve to alternately unbalance the cycling valve so that it will reciprocate, and an alignment valve in one of the pilot lines responsive to the alignment of the system so that the power cylinder will be inoperative when the system is in a certain alignment and will be operative when a tower is out of the certain alignment to bring it back to the certain alignment.

2. The structure of claim 1 further characterized by and including a control valve in each of the pilot lines on each side of the cycling valve responsive to operation of the power cylinder to alternately relieve the pressure on one side or the other of the cycling valve as the power cylinder reciprocates.

3. The structure of claim 1 further characterized by and including a settling tank in the supply line mounted on the tower so that foreign matter will settle out and not go to the cycling valve.

4. The structure of claim 1 further characterized by and including an electrical safety shutdown system on the pipe including a control at each tower, a cam for the control responsive to alignment of the system, and a follower-actuated electric switch cooperating with the cam to deenergize the system in the event of substantial misalignment resulting from a malfunction.

5. The structure of claim 4 further characterized in that the alignment valve also bears against and is responsive to the cam.

6. The structure of claim 1 further characterized in that the power cylinder is double-acting .

7. The structure of claim 1 further characterized by and including a ratchet on each end of the power cylinder adapted to engage lugs on the wheels to turn them.

8. In a center pivot irrigation system, a center pivot that serves as a source of water supply, a main water pipe extending outwardly therefrom made up of a series of pipe sections interconnected end to end in articulated joints, a wheeled tower at each of the joints, each tower having a water-operated power cylinder adapted to reciprocate to rotate the wheels, a supply line connected between the main water pipe and the power cylinder, a cycling valve in the supply line and adapted to alternately supply water from the supply line to at least one side of the power cylinder, an alignment mechanism at the articulated joint indicative of the alignment of one pipe section relative to its adjacent pipe section, and means responsive to the alignment mechanism for controlling the cycling valve, pilot lines connected to each end of the cycling valve to alternately unbalance the cycling valve so that it will reciprocate, and an alignment valve in one of the pilot lines responsive to the alignment of one pipe section relative to its adjacent pipe section so that the power cylinder will be inoperative when alignment is proper and will be operative when alignment is improper.

9. The structure of claim 8 further characterized in that the power cylinder is double-acting.

10. The structure of claim 8 further characterized by and including a settling tank in the supply line mounted on the tower so that foreign matter will settle out and not go to the cycling valve.

11. The structure of claim 8 further characterized by and including an electrical safety shutdown system on the water pipe including a control at each tower, a cam for the control responsive to alignment of the system, and a follower-actuated electrical switch cooperating with the cam to deenergize the system in the event of substantial misalignment resulting from a malfunction.

12. The structure of claim 8 further characterized in that the power cylinder has a ratchet on each end engaging lugs on the tower wheels.

* * * * *